United States Patent [19]
von Zweygbergk

[11] Patent Number: 5,117,142
[45] Date of Patent: May 26, 1992

[54] PERMANENT MAGNETIZED SYNCHRONOUS MACHINE DESIGNED ACCORDING TO THE TRANSVERSE FLUX PRINCIPLE

[75] Inventor: Svante G. A. von Zweygbergk, Kungsbacka, Sweden

[73] Assignee: 501 IBK AB, Sweden

[21] Appl. No.: 648,016

[22] Filed: Jan. 30, 1991

[30] Foreign Application Priority Data

Nov. 20, 1989 [SE] Sweden ............................... 8903876

[51] Int. Cl.$^5$ ............................................. H02K 21/12
[52] U.S. Cl. ........................................ 310/156; 310/179; 310/254; 310/112
[58] Field of Search ............... 310/156, 162, 254, 163, 310/164, 165, 112, 179, 180, 184, 49 R

[56] References Cited

U.S. PATENT DOCUMENTS

3,334,254 8/1967 Kober ...................................... 310/156
4,308,479 12/1981 Richter .................................... 310/156

Primary Examiner—Steven L. Stephan
Assistant Examiner—E. H. To
Attorney, Agent, or Firm—Marshall & Melhorn

[57] ABSTRACT

An electrical machine, according to the transverse flux principle, is constructed such that the magnetic flux flows in paths perpendicular to the direction of rotation of the rotor. The number of stator elements is double the number in the conventional transverse flux machine making this number equal to the number of rotor bars provided with permanent magnets. All the stator elements have the same shape, but are alternately turned 180° with respect to the permanent magnet axis. Further, the permanent magnets of the adjacent rotor bars are of opposite polarity. Such a machine has almost twice the power of the conventional transverse flux machine of the same volume, and also has higher efficiency since the inactive amount of copper has been reduced. This machine can be designed as a generator or a motor, and for multi-phase operation.

6 Claims, 8 Drawing Sheets

PERMANENT MAGNETIZED SYNCHRONOUS MACHINE DESIGNED ACCORDING TO THE TRANSVERSE FLUX PRINCIPLE

BACKGROUND OF THE INVENTION

Figure 1:
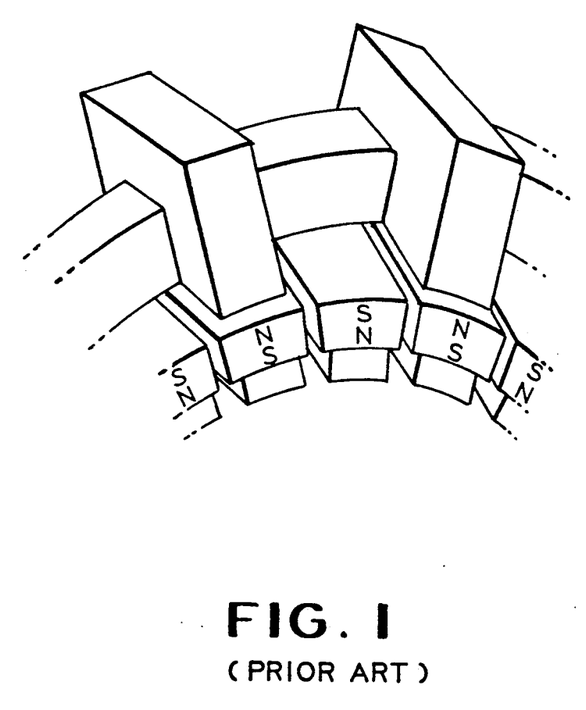
FIG. 1 shows an existing machine of the transverse flux type.

In the art, it is known to arrange the magnets in a permanent magnetized synchronous machine so as to cause the magnetic flux to flow in paths at right angles to the direction of rotation of the rotor. A machine of this type, designed according to what is called the transverse flux principle, is illustrated in FIG. 1. The rotor of such a machine is made up of permanent magnets of alternate polarity. The magnets are secured to bars of magnetic material which serve as magnetic return conductors. The stator consists of U-shaped stator elements of magnetic material, the number of which is equal to half the number of magnets. The stator winding is designed as a ring winding. This means that, if the distance between the magnet bars, known as the pole pitch, is small, the copper volume per stator element becomes small, like the copper losses.

When the rotor is in a given position, the magnetic flux flows through all the stator elements in the same direction. When the rotor has rotated through one pole pitch, the direction of the flux through the stator elements has been reversed. When the rotor has rotated through another pole pitch, the direction of the flux through the stator elements has again been reversed. Thus, the flux through the ring winding accomplishes one cycle as the rotor rotates through two pole pitches.

As compared with a machine of the longitudinal flux type, the transverse flux machine of the invention offers the following advantages:

The cross-sectional area of the magnetic flux is practically constant throughout the path of flux. The iron losses in such a machine therefore are smaller than in a longitudinal machine, where locally, especially in the tooth area, the flux density is considerably higher than in the rest of the magnetic circuit.

In a transverse flux machine, the active amount of copper, consisting of the copper ring between the stator elements, is considerably smaller than in a longitudinal machine where the inactive amount of copper consists of the coil ends.

Thus, the transverse flux machine represents, in terms of weight and volume, an energy-dense machine of high efficiency. The shorter the pole pitch is, the smaller becomes the active amount of copper and the higher the efficiency.

SUMMARY OF THE INVENTION

The present invention aims at further considerably increasing the efficiency and the energy density per unit volume in a transverse flux machine. The inventive concept resides in radically changing both the stator and the rotor design, thereby making it possible to double the number of stator elements, which thus becomes equal to the number of magnets. In this manner, the power is doubled for a given volume.

BRIEF DESCRIPTION OF THE DRAWINGS

The invention will now be described in more detail with reference to the accompanying drawings, in which.

DESCRIPTION OF THE PREFERRED EMBODIMENT

Figure 2:
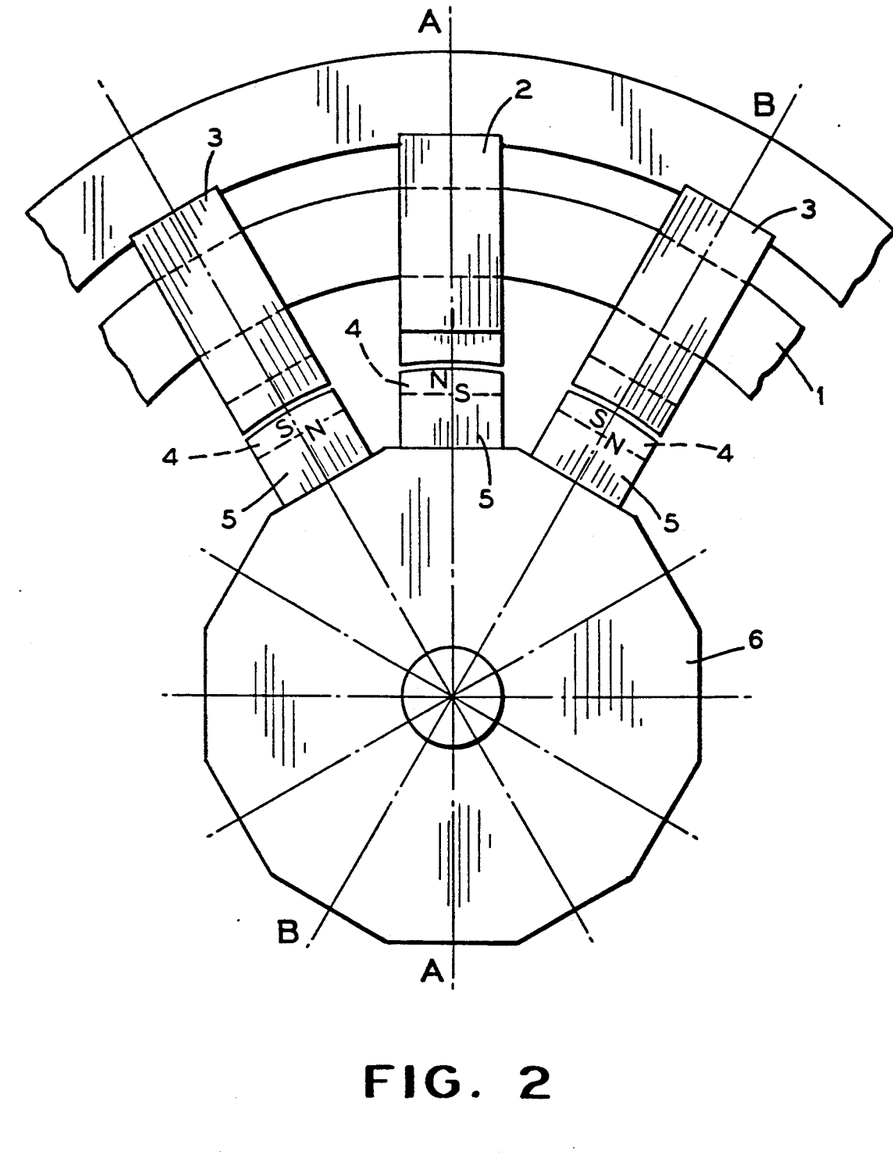
FIG. 2 shows the machine according to the invention seen in the direction of the machine axis.
Figure 2A:
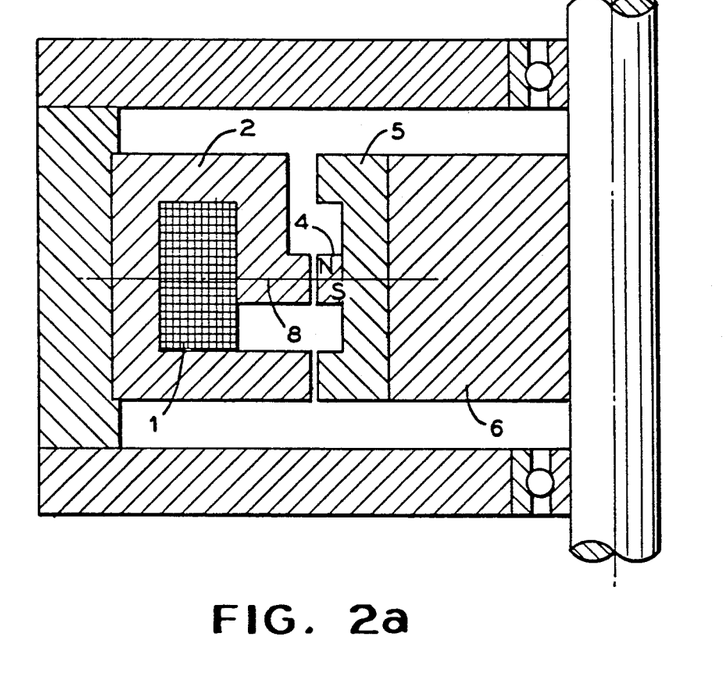
FIG. 2a is a part sectional view taken along the line A—A in FIG. 2.
Figure 2B:
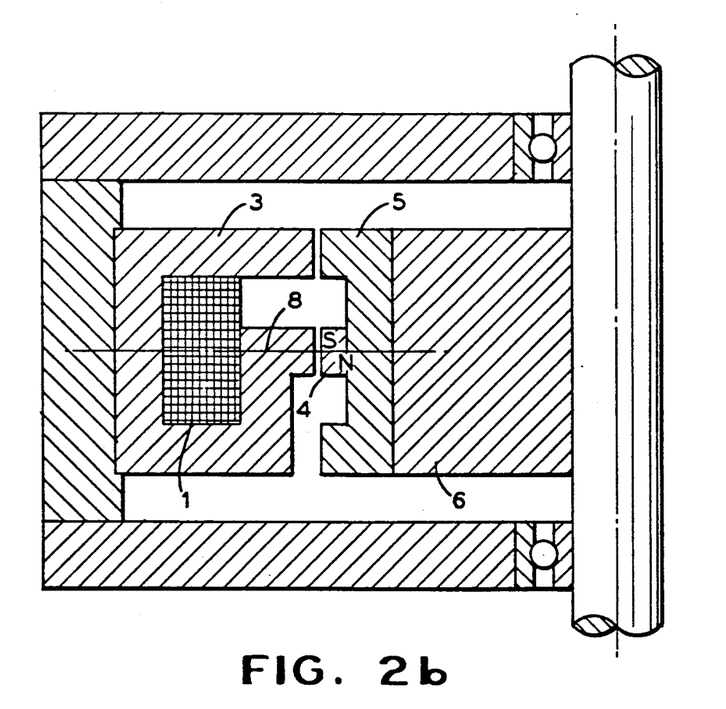
FIG. 2b is a part sectional view taken along the line B—B in FIG. 2.

The permanent magnets in FIGS. 2a and 2b are magnetized in opposite directions. In FIGS. 2, 2a and 2b, numeral 1 designates a ring winding, and numerals 2 and 3 designate stator elements made of laminated sheet metal. All the stator elements are identical, but every other element is turned 180° with respect to the magnet axis 8. Numeral 4 designates the permanent magnets. These magnets are centrally fixed on bars of soft iron or laminated sheet metal 5, which in turn are fixed to the rotor hub 6. In the bars 5 are generally U-shaped in cross section with radially outwardly extending legs. The stator elements 2 and 3 are generally rectangular in cross section with a central aperture formed for the ring 1. The stator elements are asymmetrical, each having a lower wall opening formed therein bounded by a pair of radially inwardly extending legs, one leg being adjacent the permanent magnet 4 and the other leg being adjacent one of the legs of the bar 5. The position shown in FIG. 2, the magnetic flux in all of the stator elements flows along the ring winding in the same direction. When the rotor has rotated through one pole pitch, the magnetic flux in all stator elements flows along the ring winding in the opposite direction. The frequency of the electromotive force induced in the ring winding is equal to the product of the rotor speed and half the number of poles.

The new generator, here called G2, offers the following advantages over the generator in FIG. 1, here called G1.

G2 has twice as many stator elements within the same volume as G1 and, hence, a power density per unit volume that is twice as high for the same amount of permanent-magnetic material. G2 has higher efficiency than G1 since the copper losses are equal in both machines.

Figure 3:
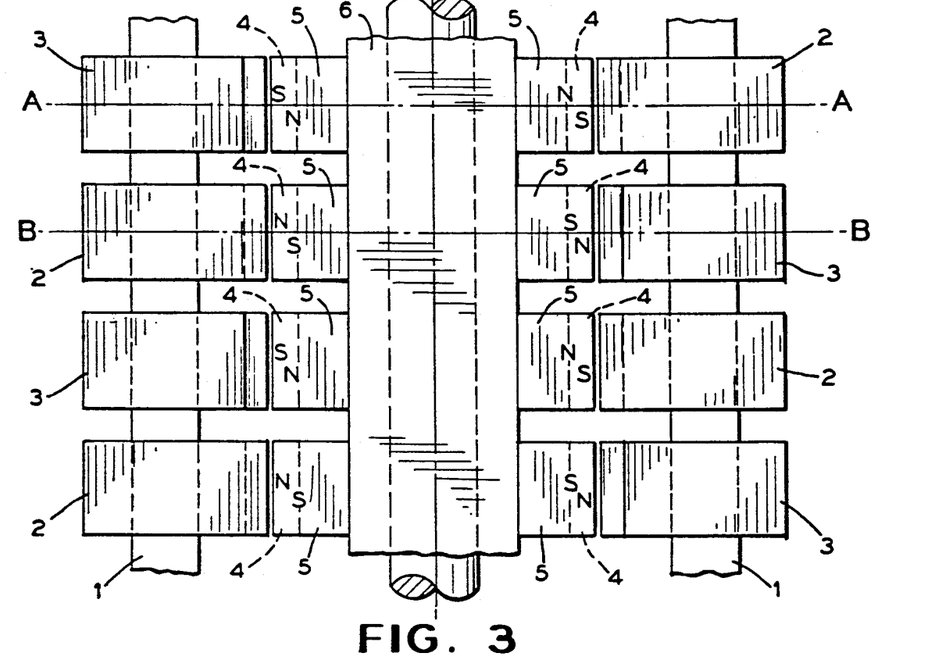
FIGS. 3, 3a and 3b show the machine of the invention in double-sided design.
Figure 3A:
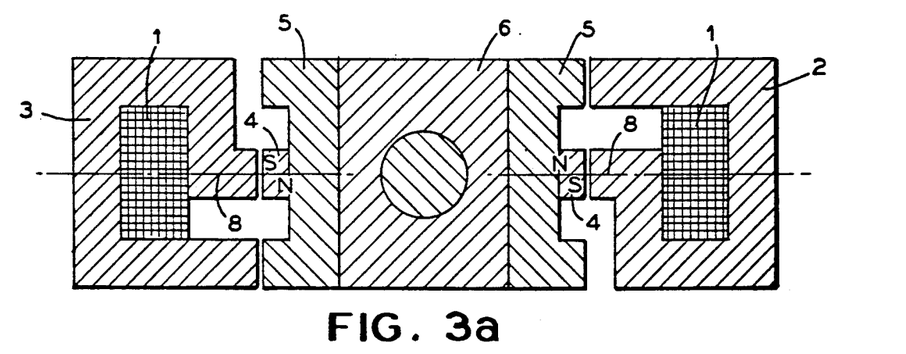
Figure 3B:
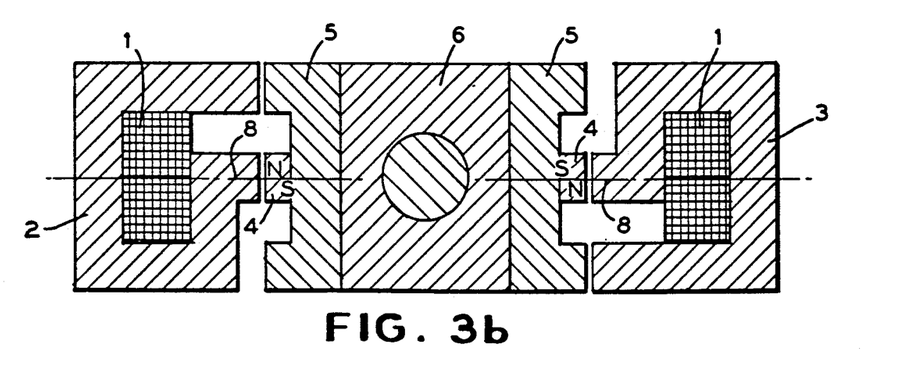

It is known that the generator of FIG. 1 can be given a double-sided design, e.g. for two-phase operation. The generator according to the invention can also be given a double-sided design. For the sake of simplicity, such a design is shown in FIGS. 3, 3a and 3b as a linear machine. The numerals in these Figures refer to equivalent parts in FIGS. 2, 2a and 2b.

Figure 4:
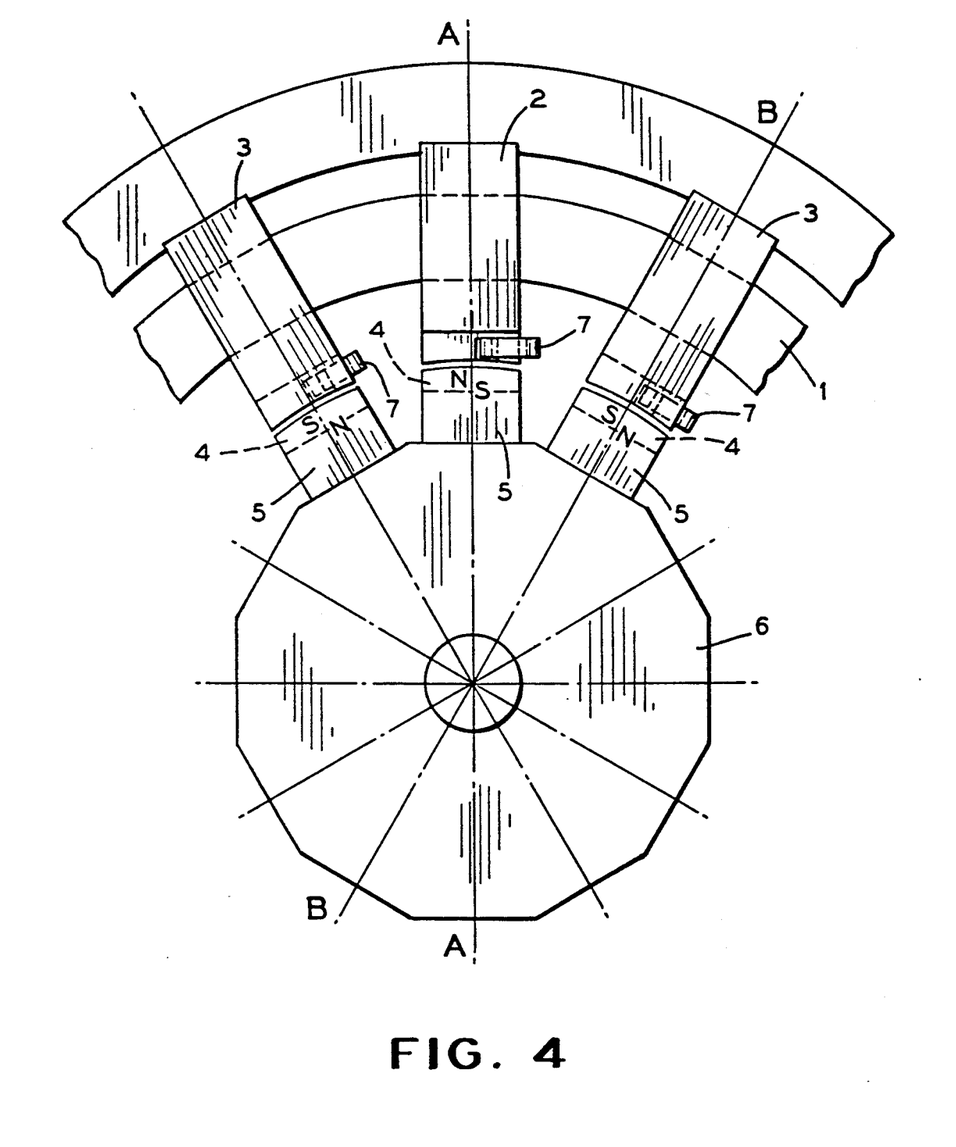
FIGS. 4, 4a, and 4b show the machine of the invention designed as a shield pole type motor.
Figure 4A:
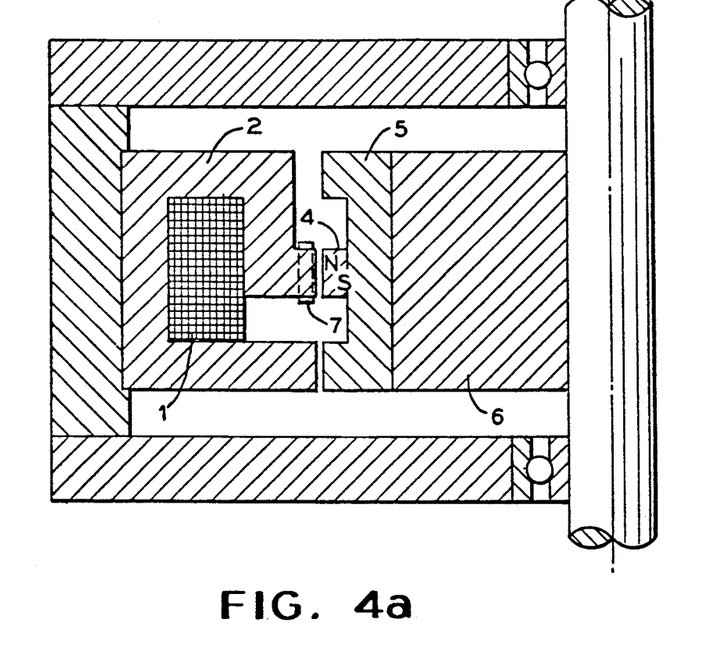
Figure 4B:
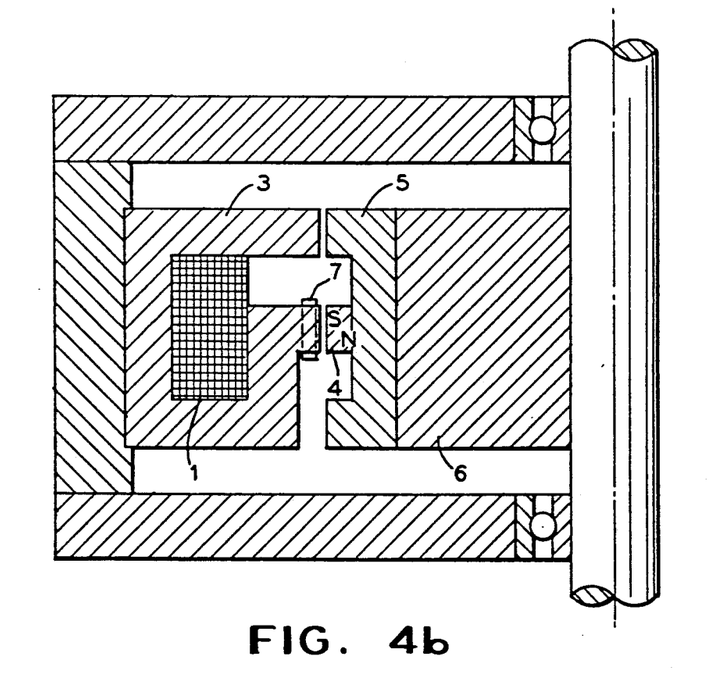

The machine in FIG. 2 can also be used as a motor. However, since it is a one-phase machine, this embodiment has no starting torque. By designing the machine as a shield pole type machine, it can generate, also in the one-phase embodiment, a certain starting torque. FIGS. 4, 4a, and 4b show a shield pole type motor design. A portion of the iron surface facing the air gap is grooved and provided with a short-circuit ring 7. In the case of one-phase feed, the flux through the short-circuit ring will be delayed in relation to the flux that does not pass through the short-circuit ring, this yielding a rotary flux and hence a torque in the same way as in a conventional shield pole type motor.

The machine in FIG. 2 can also be designed as a multi-phase machine for a phase number = 3, 4, 5 .... In this case, m unit machines are arranged on the same axis, the stators or the rotors being offset 360/m electric degrees in relation to each other.

Figure 5:
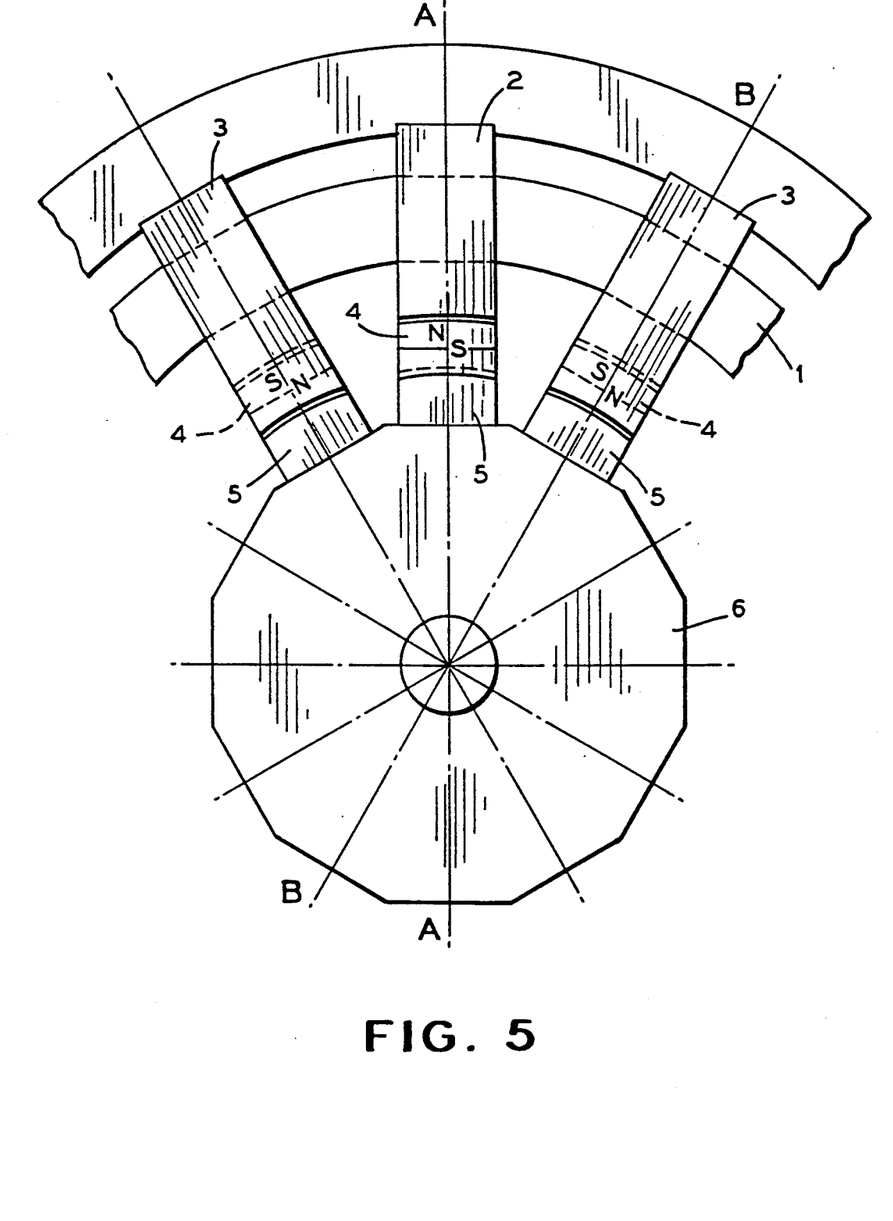
FIGS. 5, 5a and 5b show a variant of the machine in FIGS. 2, 2a and 2b.
Figure 5A:
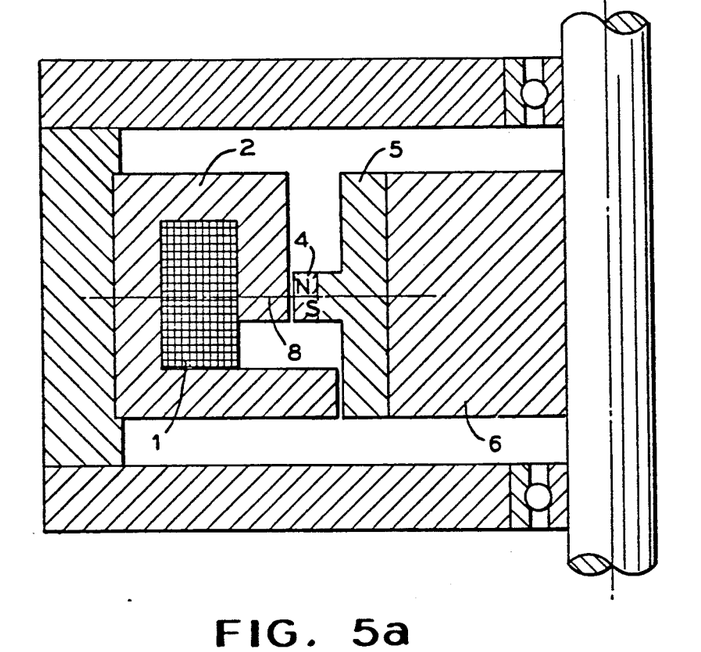
Figure 5B:
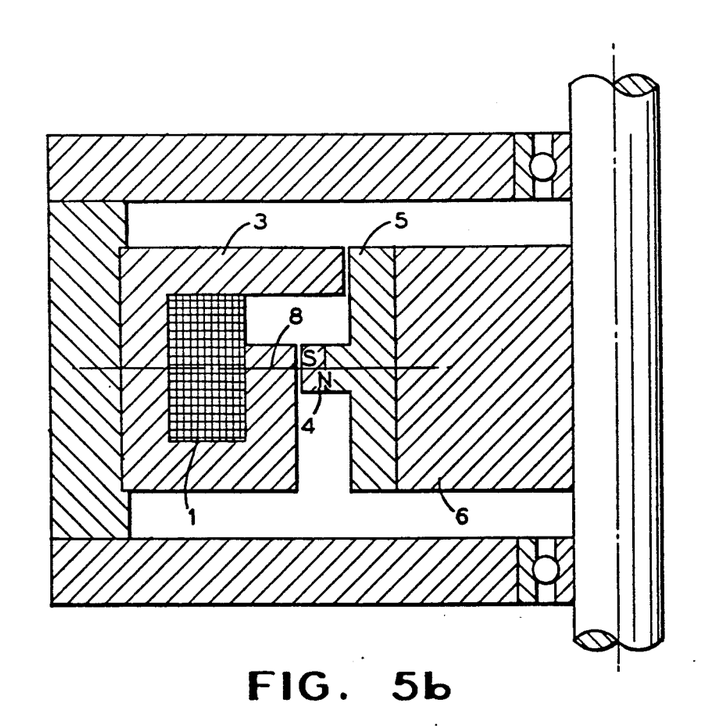

A variant of the machine in FIGS. 2, 2a and 2b is shown in FIGS. 5, 5a and 5b. In these machines, the stator and the rotor have a slightly different appearance, but the principle of operation remains the same in both machines.

What I claim and desire to secure by Letters Patent is:

1. A permanent-magnetized synchronous machine, operating according to the transverse flux principle, comprising:
 - a rotor, rotatable about a longitudinal axis thereof, formed from a predetermined number of stellately arranged rotor bars of magnetic material mounted on a rotor hub, a plurality of permanent magnets, equal in number to said predetermined number, each centrally attached to an associated one of said rotor bars and oriented such that an axis of magnetization of each of said permanent magnets is perpendicular to the longitudinal axis of said rotor and that adjacent ones of said permanent magnets have opposite magnetic polarity; and
 - a stator having a ring winding extending around an outer circumference of said rotor and surrounded by a plurality of stator elements formed of magnetic material and being asymmetric with respect to the axis of magnetization of said permanent magnets, said stator elements being equal in number to said predetermined number and alternate ones of said stator elements being turned 180° with respect to the axis of magnetization.

2. The machine according to claim 1 wherein said rotor includes two sets of said rotor bars with said permanent magnets mounted on said rotor hub, and wherein said stator includes two sets of said stator elements such that said rotor bars and said stator elements are equal in number.

3. The machine according to claim 2 wherein said stator has a plurality of short circuit rings mounted thereon.

4. The machine according to claim 2 wherein said rotor and said stator forms a unit machine and including "m" said unit machines arranged on the same axis with one of said stators and said rotors offset 360/m electric degrees with respect to each other and wherein "m" is an integer.

5. The machine according to claim 1 wherein said stator has a plurality of short circuit rings mounted thereon.

6. The machine according to claim 1 wherein said rotor and said stator forms a unit machine and including "m" said unit machines arranged on the same axis with one of said stators and said rotors offset 360/m electric degrees with respect to each other and wherein "m" is an integer.

* * * * *